(12) United States Patent
Chang (10) Patent No.: US 6,382,736 B1
(45) Date of Patent: May 7, 2002

(54) WHEEL DEVICE

(76) Inventor: Wen-Chen Chang, 58, Ma Yuan West St., Taichung (TW)

( * ) Notice: Subject to any disclaimer, the term of this patent is extended or adjusted under 35 U.S.C. 154(b) by 0 days.

(21) Appl. No.: 09/780,323

(22) Filed: Feb. 7, 2001

(51) Int. Cl.[7] .............................................. B60B 37/00
(52) U.S. Cl. ..................... 301/111.05; 16/44; 190/18 A
(58) Field of Search ....................... 301/111.01, 111.05, 301/111.07, 125; 190/18 A; 280/43.24, 86.1; 16/18 R, 44, 45, 46

(56) References Cited

U.S. PATENT DOCUMENTS

| | | | |
|---|---|---|---|
| 2,040,121 A | * 5/1936 | Bowen | 16/44 |
| 2,577,244 A | * 12/1951 | Hedgpeth | 16/44 |
| 3,349,425 A | * 10/1967 | Rabelos | 16/44 |
| 5,355,550 A | * 10/1994 | Yang | 16/44 |
| 5,873,145 A | * 2/1999 | Chou | 301/111.05 |
| 5,875,519 A | * 3/1999 | Chou | 301/111.05 |

* cited by examiner

Primary Examiner—Russell D. Stormer (57) ABSTRACT

A wheel device has a fixed seat, a wheel support seat disposed in the fixed seat, and a wheel inserted in the wheel support seat. The wheel has a center hole. The fixed seat has a convex housing. The wheel support seat has a hollow interior, two opposite oblong holes, and two opposite enlarged holes. Two springs are inserted in the oblong holes of the wheel support seat. A shaft passes through the enlarged holes of the wheel support seat and the center hole of the wheel. A bolt fastens the wheel support seat and the fixed seat together.

2 Claims, 8 Drawing Sheets

WHEEL DEVICE

BACKGROUND OF THE INVENTION

The present invention relates to a wheel device. More particularly, the present invention relates to a wheel device for a suitcase.

A suitcase has four conventional wheel devices. The conventional wheel device has a fixed wheel support seat. If the fixed wheel support seat is damaged, the user cannot replace the fixed wheel support seat.

SUMMARY OF THE INVENTION

An object of the present invention is to provide a wheel device which has a wheel support seat to be detached easily while the wheel support seat is damaged.

Another object of the present invention is to provide a wheel device which has a shock-absorbing function.

In accordance with a first preferred embodiment of the present invention, a wheel device comprises a fixed seat, a wheel support seat disposed in the fixed seat, and a wheel inserted in the wheel support seat. The wheel has a center hole. The fixed seat has a convex housing. The wheel support seat has a hollow interior, two opposite oblong holes, and two opposite enlarged holes communicating with the oblong holes. Two springs are inserted in the oblong holes of the wheel support seat. A shaft passes through the enlarged holes of the wheel support seat and the center hole of the wheel. A bolt fastens the wheel support seat and the fixed seat together.

In accordance with a second preferred embodiment of the present invention, a wheel device comprises a wheel support seat, and a wheel inserted in the wheel support seat. The wheel has a center hole. The wheel support seat has a convex housing, two click grooves, a plurality of oblong holes, and a plurality of enlarged holes communicating with the oblong holes. Two springs are inserted in the oblong holes of the wheel support seat. A shaft passes through the enlarged holes of the wheel support seat and the center hole of the wheel. Two confining bars are inserted in the click grooves of the wheel support seat.

DETAILED DESCRIPTION OF THE INVENTION

Figure 1:
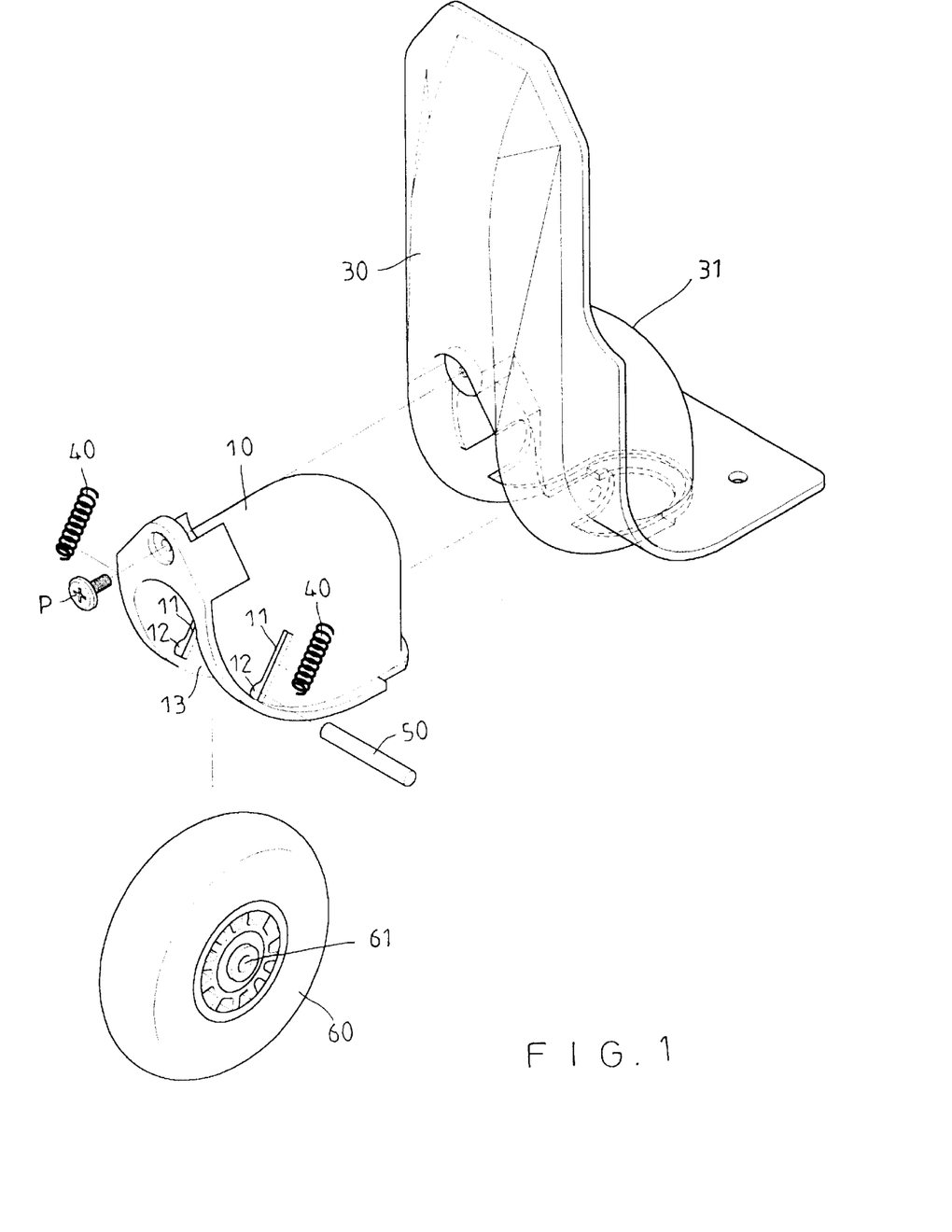
FIG. 1 is a perspective exploded view of a wheel device of a first preferred embodiment in accordance with the present invention.
Figure 2:
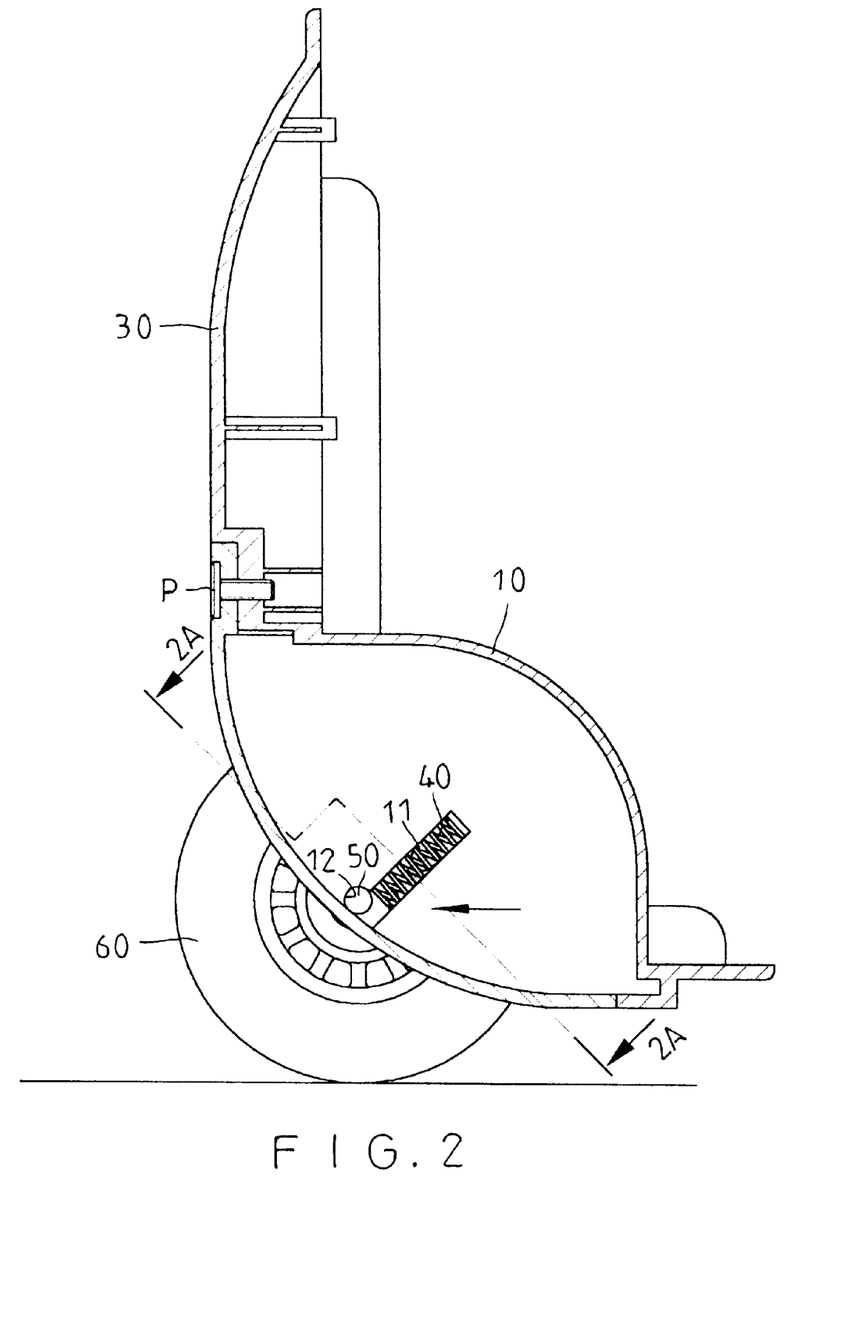
FIG. 2 is a sectional assembly view of a wheel device of a first preferred embodiment in accordance with the present invention.
Figure 2A:
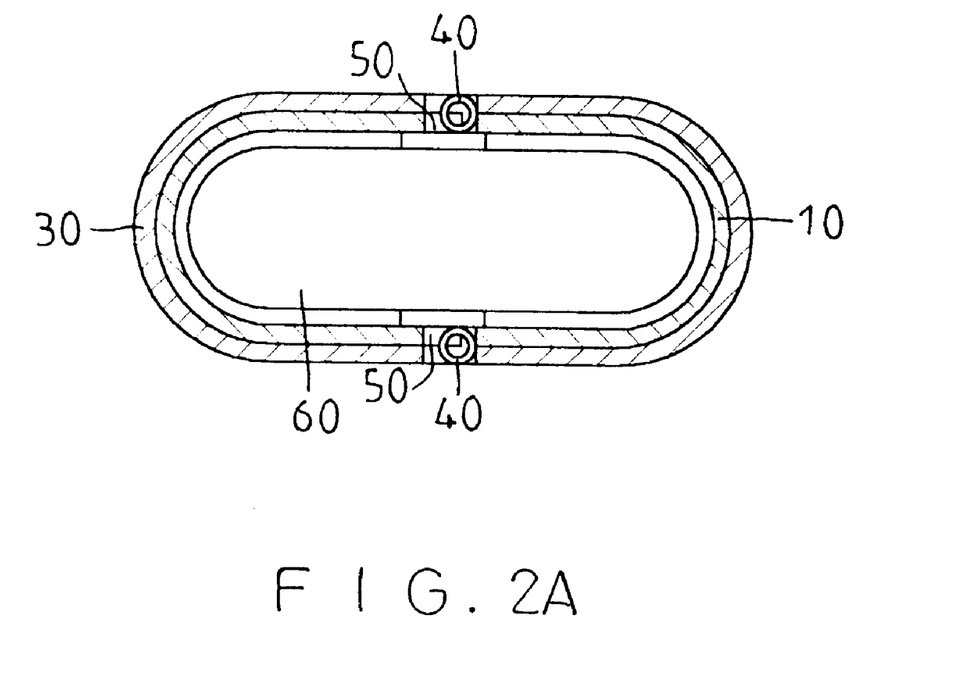
FIG. 2A is a sectional view taken along line 2A—2A in FIG. 2.
Figure 3:
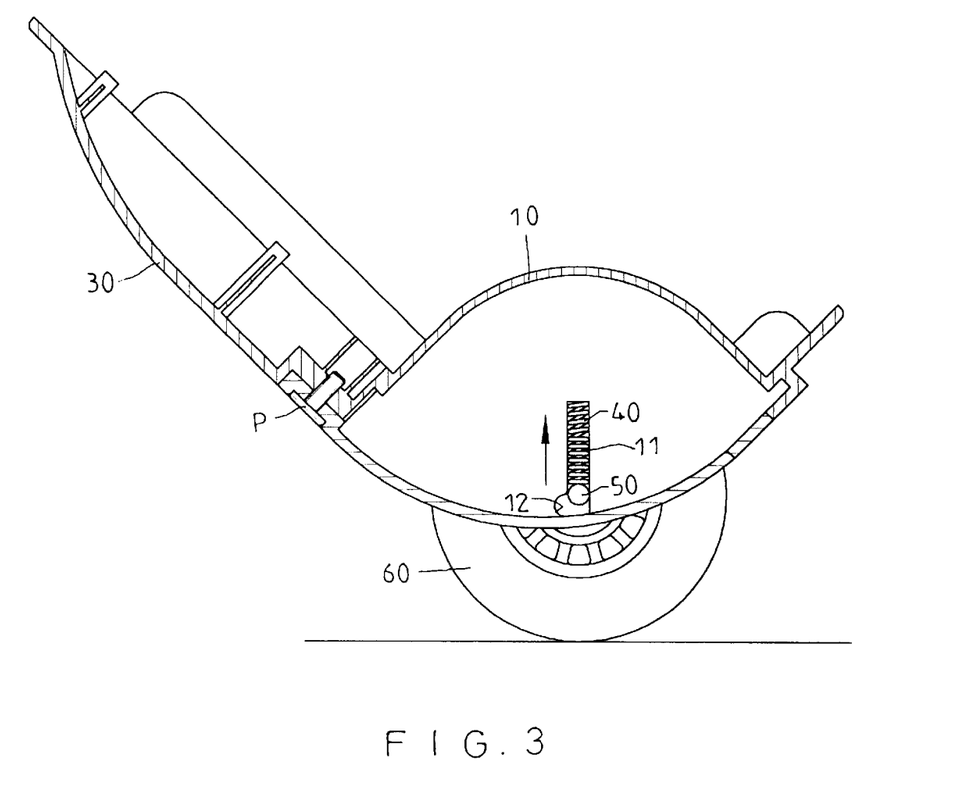
FIG. 3 is a sectional schematic view illustrating an operation of a wheel device of a first preferred embodiment in accordance with the present invention.

Referring to FIGS. 1 to 3, a wheel device comprises a fixed seat 30, a wheel support seat 10 disposed in the fixed seat 30, and a wheel 60 inserted in the wheel support seat 10.

The wheel 60 has a center hole 61.

The fixed seat 30 has a convex housing 31.

The wheel support seat 10 has a hollow interior 13, two opposite oblong holes 11, and two opposite enlarged holes 12 communicating with the oblong holes 11.

Two springs 40 are inserted in the oblong holes 11 of the wheel support seat 10.

A shaft 50 passes through the enlarged holes 12 of the wheel support seat 10 and the center hole 61 of the wheel 60.

A bolt P fastens the wheel support seat 10 and the fixed seat 30 together.

The fixed seat 30 is fastened on a bottom of a suitcase (not shown in the figures).

Figure 4:
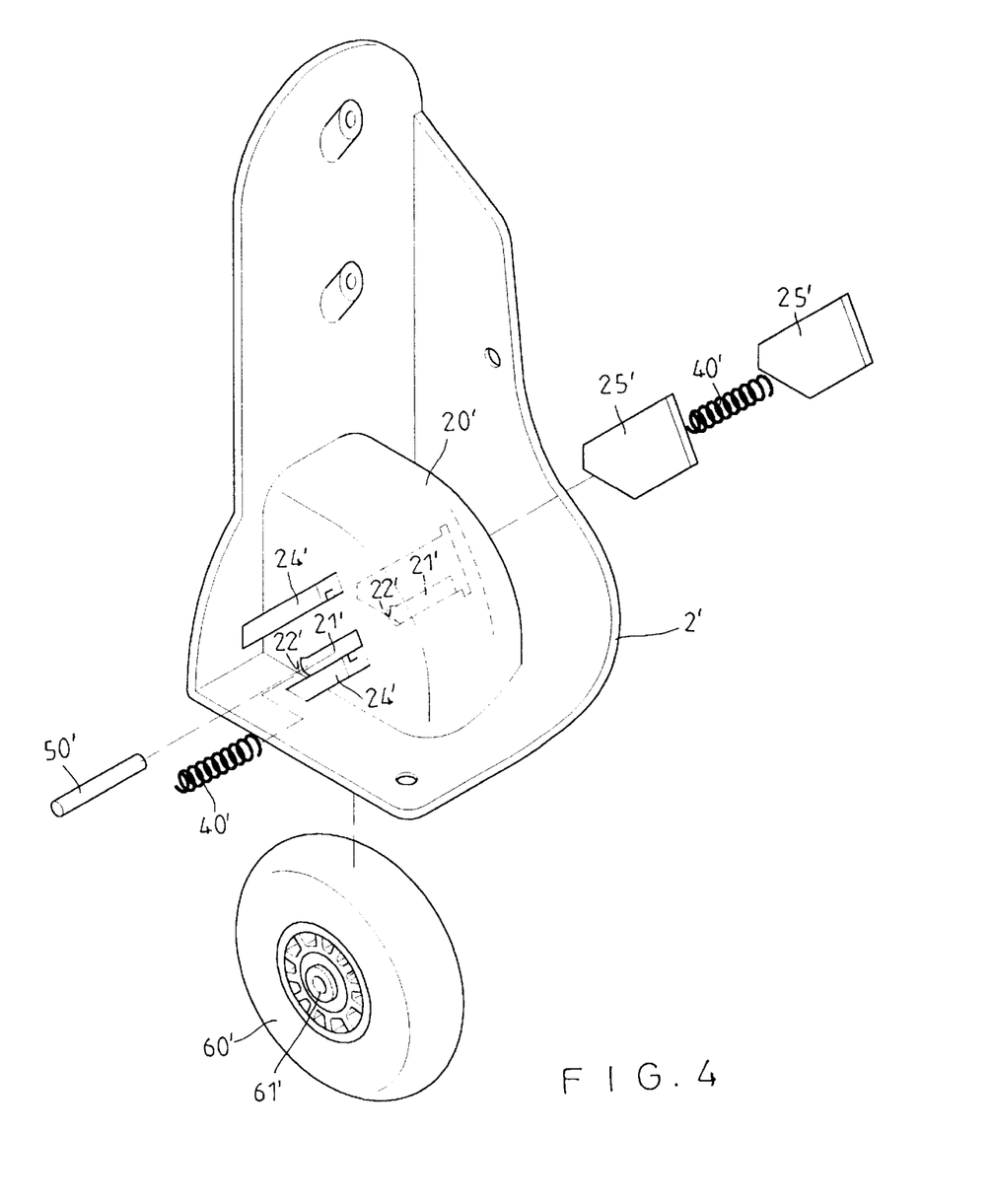
FIG. 4 is a perspective exploded view of a wheel device of a second preferred embodiment in accordance with the present invention.
Figure 5:
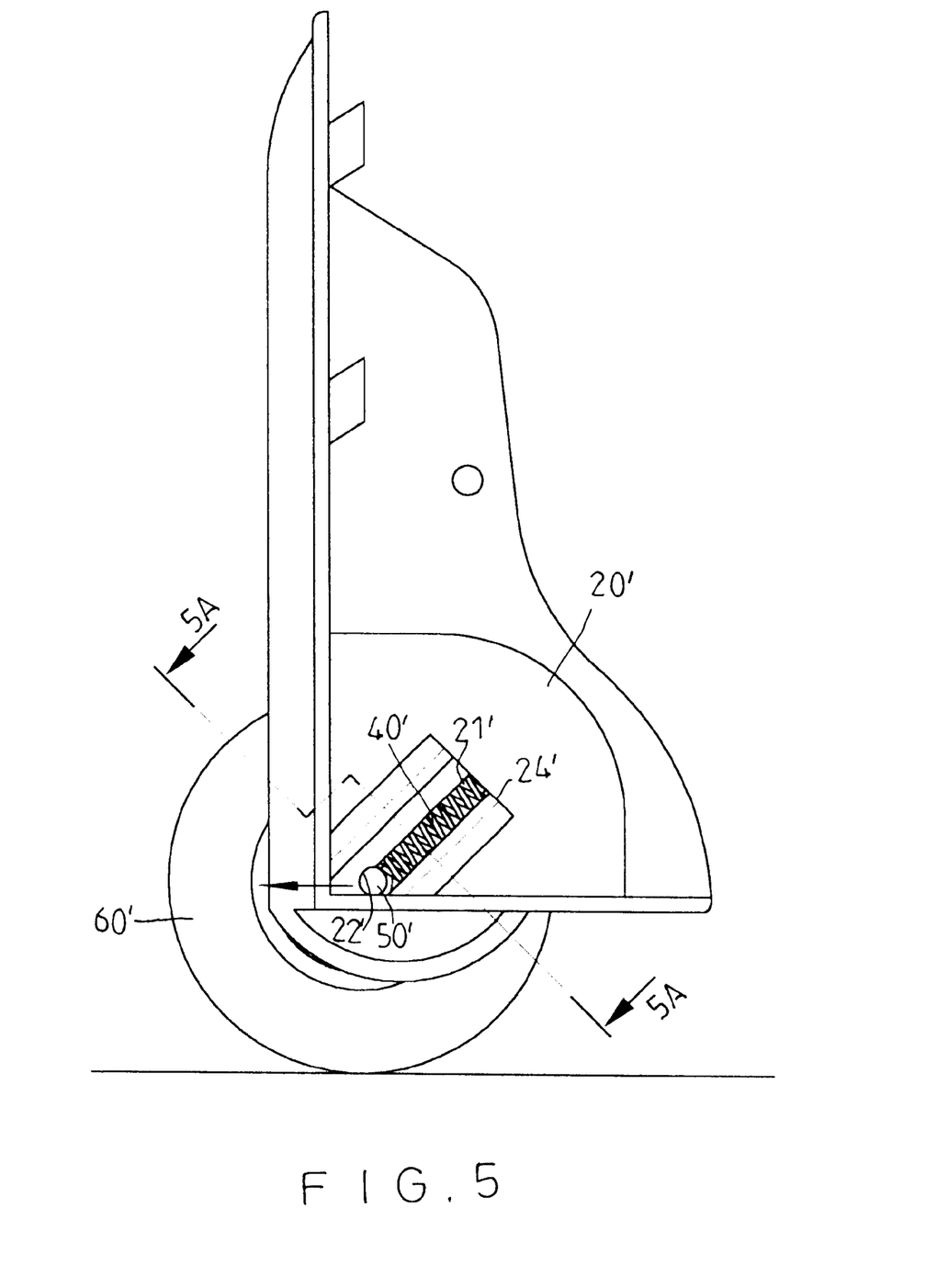
FIG. 5 is a sectional assembly view of a wheel device of a second preferred embodiment in accordance with the present invention.
Figure 5A:
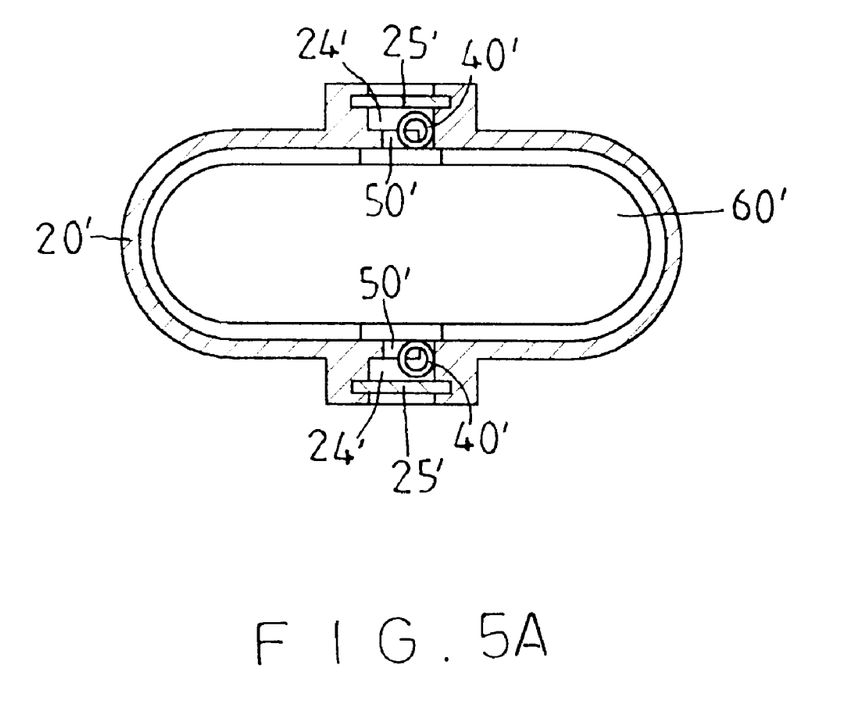
FIG. 5A is a sectional view taken along line 5A—5A in FIG. 5.
Figure 6:
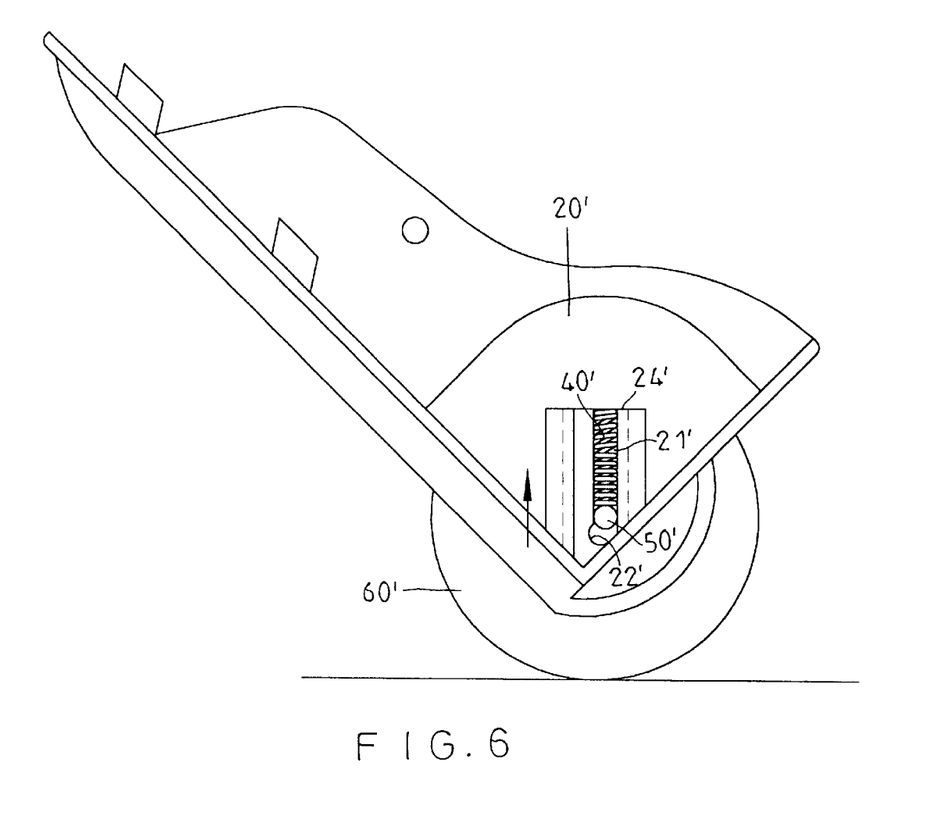
FIG. 6 is a sectional schematic view illustrating an operation of a wheel device of a second preferred embodiment in accordance with the present invention.

Referring to FIGS. 4 to 6, another wheel device comprises a wheel support seat 2', and a wheel 60' inserted in the wheel support seat 2'.

The wheel 60' has a center hole 61'.

The wheel support seat 2' has a convex housing 20', two click grooves 24', a plurality of oblong holes 21', and a plurality of enlarged holes 22' communicating with the oblong holes 21'.

Two springs 40' are inserted in the oblong holes 21' of the wheel support seat 2'.

A shaft 50' passes through the enlarged holes 22' of the wheel support seat 2' and the center hole 61' of the wheel 60'.

Two confining bars 25' are inserted in the click grooves 24' of the wheel support seat 2'.

The fixed seat 30' is fastened on a bottom of a suitcase (not shown in the figures).

The present invention is not limited to the above embodiments but various modification thereof may be made. Furthermore, various changes in form and detail may be made without departing from the scope of the present invention.

I claim:

1. A wheel device comprises:
   a fixed seat, a wheel support seat disposed in the fixed seat, and a wheel inserted in the wheel support seat,
   the wheel having a center hole,
   the fixed seat having a convex housing,
   the wheel support Seat having a hollow interior, two opposite oblong holes, and two opposite enlarged holes communicating with the oblong holes,
   two springs inserted in the oblong holes of the wheel support seat,
   a shaft passing through the enlarged holes of the wheel support seat and the center hole of the wheel, and
   a bolt fastening the wheel support seat and the fixed seat together.

2. A wheel device comprises:

a wheel support seat, and a wheel inserted in the wheel support seat, the wheel having a center hole, the wheel support seat having a convex housing, two click grooves, a plurality of oblong holes, and a plurality of enlarged holes communicating with the oblong holes, two springs inserted in the oblong holes of the wheel support seat, a shaft passing through the enlarged holes of the wheel support seat and the center hole of the wheel, and two confining bars inserted in the click grooves of the wheel support seat.

* * * * *